US010302958B2

(12) United States Patent
Zhou et al.

(10) Patent No.: US 10,302,958 B2
(45) Date of Patent: May 28, 2019

(54) DISPLAY APPARATUS, STEREOSCOPIC DISPLAY APPARATUS, AND APPLICATION TERMINAL THEREOF

(71) Applicants: Huawei Technologies Co., Ltd., Shenzhen (CN); Cambridge Enterprise Limited, Cambridgeshire (GB)

(72) Inventors: Jiong Zhou, Shenzhen (CN); Kun Li, Cambridge (GB); Daping Chu, Cambridge (GB)

(73) Assignees: Huawei Technologies Co., Ltd., Shenzhen (CN); Cambridge Enterprise Limited, Cambridgeshire (GB)

( * ) Notice: Subject to any disclaimer, the term of this patent is extended or adjusted under 35 U.S.C. 154(b) by 0 days.

(21) Appl. No.: 15/643,218

(22) Filed: Jul. 6, 2017

(65) Prior Publication Data

US 2017/0315374 A1 Nov. 2, 2017

Related U.S. Application Data

(63) Continuation of application No. PCT/CN2016/070299, filed on Jan. 6, 2016.

(30) Foreign Application Priority Data

Jan. 6, 2015 (CN) .......................... 2015 1 0006132
Jan. 5, 2016 (CN) .......................... 2016 1 0010113

(51) Int. Cl.
*G02F 1/1343* (2006.01)
*G02F 1/1335* (2006.01)
(Continued)

(52) U.S. Cl.
CPC ............. *G02B 27/30* (2013.01); *G02B 27/22* (2013.01); *G02B 27/2264* (2013.01);
(Continued)

(58) Field of Classification Search
CPC ................ G02B 27/30; G02B 27/2264; G02B 27/2214; G02B 27/22; G02B 27/2278;
(Continued)

(56) References Cited

U.S. PATENT DOCUMENTS 6,147,737 A 11/2000 Yachi
2005/0202579 A1* 9/2005 Huang .............. H01L 27/14621
438/22

(Continued)

FOREIGN PATENT DOCUMENTS

CN 101424808 B 1/2011
CN 102483552 A 5/2012
(Continued)

OTHER PUBLICATIONS

Dodgson, "Optical Devices 3D without the glasses," News and Views, vol. 495, pp. 316-317, Nature, Macmillan Publishers Ltd (Mar. 21, 2013).
(Continued)

*Primary Examiner* — Shan Liu
(74) *Attorney, Agent, or Firm* — Leydig, Voit & Mayer, Ltd.

(57) ABSTRACT

The present disclosure discloses a display apparatus, a stereoscopic display apparatus, and an application terminal thereof. The display apparatus includes a display panel and a light collimation module. The display panel includes an RGB pixel array. The RGB pixel array includes multiple RGB pixels disposed at intervals. The light collimation module includes a control electrode layer, a first transparent substrate, a liquid crystal layer, and a second transparent substrate. The control electrode layer is disposed within the intervals between the RGB pixels or at positions that are on the display panel and that are corresponding to the intervals between the RGB pixels. The first transparent substrate is
(Continued)

disposed on the display panel and covers the control electrode. The liquid crystal layer is disposed on the first transparent substrate. The second transparent substrate is disposed on the liquid crystal layer.

4 Claims, 5 Drawing Sheets (51) Int. Cl.
| | |
|---|---|
| *G02F 1/1339* | (2006.01) |
| *G02F 1/29* | (2006.01) |
| *G02B 27/30* | (2006.01) |
| *G02B 27/22* | (2018.01) |
| *G02F 1/1333* | (2006.01) |

(52) U.S. Cl.
CPC .......... *G02F 1/1339* (2013.01); *G02F 1/1343* (2013.01); *G02F 1/13439* (2013.01); *G02F 1/133514* (2013.01); *G02F 1/134309* (2013.01); *G02F 1/134363* (2013.01); *G02F 1/29* (2013.01); *G02F 1/133512* (2013.01); *G02F 2001/133314* (2013.01); *G02F 2001/134345* (2013.01); *G02F 2201/121* (2013.01); *G02F 2201/52* (2013.01)

(58) Field of Classification Search
CPC .. G02B 6/0053; G02B 3/0056; G02B 27/225; G02B 27/26; G02F 1/134363; G02F 1/133514; G02F 1/29; G02F 1/1339; G02F 1/13439; G02F 2201/121; G02F 2201/52; G02F 2001/133314; G02F 2001/134345; G02F 1/133526; G02F 1/13452; G02F 2001/133317; G02F 1/133615; G02F 1/133621; G02F 1/133512; G02F 2001/133607; H04N 13/0404

USPC ........................................ 349/15, 57, 95, 200
See application file for complete search history.

(56) References Cited

U.S. PATENT DOCUMENTS

| | | | |
|---|---|---|---|
| 2006/0228828 A1 | 10/2006 | Miller | |
| 2006/0228838 A1* | 10/2006 | Imai ................. | G02F 1/136286 |
| | | | 438/149 |
| 2007/0058107 A1* | 3/2007 | Im ..................... | G02F 1/133617 |
| | | | 349/71 |
| 2009/0190048 A1 | 7/2009 | Hong et al. | |
| 2009/0244682 A1* | 10/2009 | Saishu ............... | H04N 13/0404 |
| | | | 359/246 |
| 2010/0302349 A1 | 12/2010 | Huang et al. | |
| 2012/0169952 A1* | 7/2012 | Hikmet ................. | A47F 11/10 |
| | | | 349/34 |
| 2012/0299808 A1 | 11/2012 | Lee et al. | |
| 2013/0162919 A1 | 6/2013 | Wu et al. | |
| 2013/0201429 A1* | 8/2013 | Xu ..................... | G02F 1/133512 |
| | | | 349/95 |
| 2013/0215001 A1* | 8/2013 | Oka ....................... | G02F 1/1347 |
| | | | 345/87 |
| 2014/0160388 A1* | 6/2014 | Wu ..................... | G02F 1/133526 |
| | | | 349/43 |
| 2014/0198271 A1 | 7/2014 | Kizu et al. | |
| 2014/0218649 A1 | 8/2014 | Jeon et al. | |
| 2014/0285758 A1 | 9/2014 | Asakawa | |
| 2015/0070607 A1* | 3/2015 | Usukura .............. | G02B 3/0081 |
| | | | 349/15 |
| 2015/0146116 A1* | 5/2015 | Liao ................... | G02B 27/2214 |
| | | | 349/15 |
| 2016/0131918 A1 | 5/2016 | Chu et al. | |

FOREIGN PATENT DOCUMENTS

| | | |
|---|---|---|
| CN | 202693951 U | 1/2013 |
| CN | 103176308 A | 6/2013 |
| CN | 202975533 U | 6/2013 |
| CN | 103257486 A | 8/2013 |
| CN | 103728807 A | 4/2014 |
| CN | 104020624 A | 9/2014 |
| CN | 104297929 A | 1/2015 |
| JP | H5341270 A | 12/1993 |
| JP | 2004004616 A | 1/2004 |
| JP | 2010277064 A | 12/2010 |
| JP | 5022964 B2 | 9/2012 |
| JP | 2013218113 A | 10/2013 |
| KR | 20100049383 A | 5/2010 |
| KR | 20120131561 A | 12/2012 |
| KR | 20140080676 A | 7/2014 |
| WO | 2012141078 A1 | 10/2012 |
| WO | 2013105240 A1 | 7/2013 |

OTHER PUBLICATIONS

Fattal et al., "A multi-directional backlight for a wide-angle, glasses-free three-dimensional display," Letter, vol. 495, pp. 348-351, Nature, Macmillan Publishers Ltd (Mar. 21, 2013).

Gotchev et al., "Three-Dimensional Media for Mobile Devices," Proceedings of the IEEE, vol. 99, No. 4, pp. 708-741, Institute of Electrical and Electronics Engineers, New York, New York (Apr. 2011).

Harrold et al., "Autostereoscopic display technology for mobile 3DTV applications," Proc of SPIE-IS&T Electronic Imaging, vol. 6490, pp. 1-12 (2007).

Li et al., "High quality micro liquid crystal phase lenses for full resolution image steering in auto-stereoscopic display," vol. 22, No. 18, Optics Express, The Optical Society (Aug. 29, 2014).

\* cited by examiner

DISPLAY APPARATUS, STEREOSCOPIC DISPLAY APPARATUS, AND APPLICATION TERMINAL THEREOF

CROSS-REFERENCE TO RELATED APPLICATIONS

This application is a continuation of International Application No. PCT/CN2016/070299, filed on Jan. 6, 2016, which claims the priority of Chinese Patent Application No. 201610010113.9, filed on Jan. 5, 2016 and the priority of Chinese Patent Application No. 201510006132.X, filed on Jan. 6, 2015. All of the aforementioned patent applications are hereby incorporated by reference in their entireties.

TECHNICAL FIELD

The present disclosure relates to display technologies, and in particular, to a display apparatus, a stereoscopic display apparatus, and an application terminal thereof.

BACKGROUND

Figure 1:
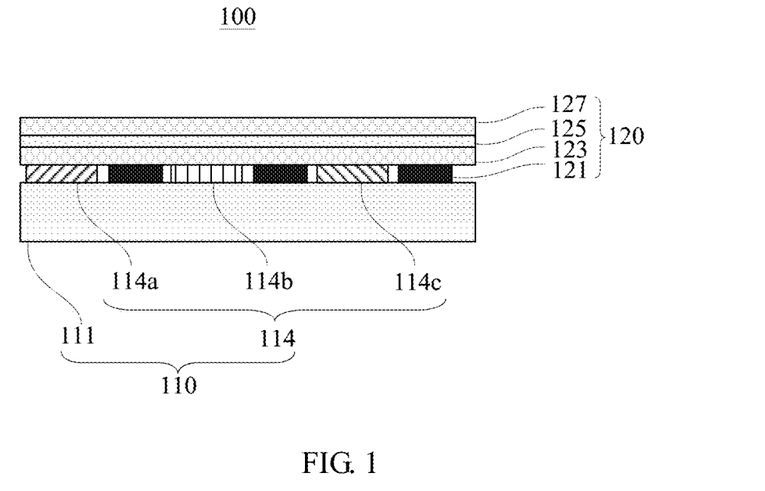
FIG. 1 is a schematic structural diagram of a display apparatus according to an embodiment of the present disclosure.

Currently, for both an LCD (Liquid Crystal Display) display and an OLED (Organic Light-Emitting Diode) display that are widely used in the industry, an image with multiple different colors needs to be displayed by adjusting a mixture ratio of red, green, and blue (RGB). However, it is found in research that regardless of an LCD display technology or an OLED display technology, relatively large scattering occurs on light emitted from an RGB filter or an RGB light-emitting unit. That is, the light has a relatively large divergence angle. As shown in FIG. 1, such light scattering causes crosstalk. Especially in a 3D display apparatus with a liquid crystal steering structure, such light scattering causes a relatively heavy light loss, that is, brightness is not enough.

SUMMARY

Embodiments of the present disclosure provide a display apparatus, a stereoscopic display apparatus, and an application terminal thereof, to reduce light scattering.

According to a first aspect, the present disclosure provides a display apparatus, including a display panel and a light collimation module, where the display panel includes an RGB pixel array, the RGB pixel array includes multiple RGB subpixels disposed at intervals, and the RGB subpixels are a red subpixel, a green subpixel, and a blue subpixel; and the light collimation module includes a control electrode layer, a first transparent substrate, a liquid crystal layer, and a second transparent substrate, the control electrode layer is disposed within the intervals between the RGB subpixels or at positions that are on the display panel and that are corresponding to the intervals between the RGB subpixels, the first transparent substrate is disposed on the display panel and covers the control electrode, the liquid crystal layer is disposed on the first transparent substrate, and the second transparent substrate is disposed on the liquid crystal layer.

In the present disclosure, a light collimation module is disposed on a display panel, to gather scattered light emitted from the display panel and to reduce light scattering, thereby improving light utilization of a display apparatus, and improving display brightness and a display effect.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

As shown in FIG. 1, the present disclosure provides a display apparatus 100. The display apparatus 100 includes a display panel 110 and a light collimation module 120. The display panel 110 includes a transparent baseplate 111 and an RGB pixel array 114. The RGB pixel array includes multiple RGB subpixels disposed at intervals. The RGB subpixels are a red subpixel 114a, a green subpixel 114b, and a blue subpixel 114c. The light collimation module 120 includes a control electrode layer 121, a first transparent substrate 123, a liquid crystal layer 125, and a second transparent substrate 127. The control electrode layer 121 is disposed within the intervals between the RGB subpixels or at positions that are on the display panel 110 and that are corresponding to the intervals between the RGB subpixels, that is, positions that are on the display panel 110 and at which orthographic projections of the intervals between the RGB subpixels fall. The first transparent substrate 123 is disposed on the display panel 110 and covers the control electrode 121. The liquid crystal layer 125 is disposed on the first transparent substrate 123. The second transparent substrate 127 is disposed on the liquid crystal layer 125.

In the present disclosure, a light collimation module 120 is disposed on a display panel 110, to gather scattered light emitted from the display panel 110 and to reduce light scattering, thereby improving light utilization of a display apparatus, and improving display brightness and a display effect.

The following provides description in detail by using multiple embodiments.

Figure 2:
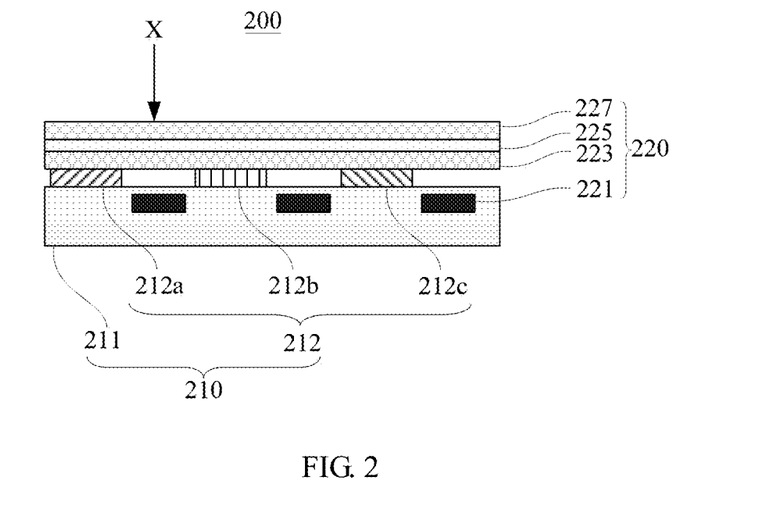
FIG. 2 is a schematic structural diagram of a display apparatus according to an alternative embodiment of the present disclosure.

FIG. 2 is a schematic structural diagram of a display apparatus 200 according to an embodiment of the present disclosure.

The display apparatus 200 includes a display panel 210 and a light collimation module 220.

The display panel 210 includes a transparent baseplate 211. Color filters 212 are disposed on the transparent baseplate 211. The color filters 212 include a red filter 212a, a green filter 212b, and a blue filter 212c that are arranged in an arrayed manner. Particular intervals are disposed between the red filter 212a, the green filter 212b, and the blue filter 212c.

The light collimation module 220 includes a control electrode layer 221, a first transparent substrate 223, a liquid crystal layer 225, and a second transparent substrate 227. The control electrode layer 221 is embedded in the transparent baseplate 211 and is corresponding to intervals between the filters of the color filters 212, that is, the red filter 212a, the green filter 212b, and the blue filter 212c. That is, the control electrode layer 221 is disposed at specified positions in the transparent baseplate 211. The specified positions are positions that are in the transparent baseplate 211 and at which orthographic projections of the intervals between the red filter 212a, the green filter 212b, and the blue filter 212c fall. The orthographic projections are projections in a direction perpendicular to the display panel 210, that is, a direction of an arrow X. In addition, the positions that are in the transparent baseplate 211 and at which the control electrode layer 221 is located in the direction of the arrow X are not limited. In addition, correspondingly, if an extra transparent baseplate is disposed over the color filters 210, that is, if a transparent baseplate is disposed on the other side of the color filters 210 opposite to the transparent baseplate 211, the control electrode layer 211 may be disposed in the extra transparent baseplate or on the extra transparent baseplate. The control electrode layer 221 is made of a transparent, translucent, black, or non-transparent conductive material. The conductive material may be conductive ink. The control electrode layer 221 may be formed in a manner of ink-jet printing, nano-coating, atomic layer deposition, chemical vapor deposition, or plasma ion assisted deposition. A material of the conductive ink is indium tin oxide (ITO), indium zinc oxide (IZO), a carbon nanotube (CNT), or graphite.

The first transparent substrate 223 is disposed over the display panel 210, that is, disposed on the color filters 212. The disposal includes directly disposing the first transparent substrate 223 on the color filters 212, or includes disposing the first transparent substrate 223 on the color filters 212 by using a medium material.

The liquid crystal layer 225 is disposed on the first transparent substrate 223. The liquid crystal layer 225 forms a liquid crystal micro lens array with a single-sided electrode structure (IPS, In-Plane Switching) by using an electric field generated by the control electrode layer 221. The liquid crystal micro lens array forms a light collimation structure and gathers originally divergent light. Therefore, intensity of emergent light is improved.

The second transparent substrate 227 is disposed on the liquid crystal layer 225 to protect the liquid crystal layer 225.

As shown in FIG. 2, in the present disclosure, a transparent, translucent, black, or non-transparent electrode is disposed at positions corresponding to intervals between a red filter 212a, a green filter 212b, and a blue filter 212c of color filters 212 on a display panel 210, and is combined with a liquid crystal layer 225 disposed on the color filters 212, to form a light collimation structure with a liquid crystal micro lens array. Therefore, a scattering phenomenon of emergent light of a display apparatus 200 is reduced, an image display effect is better, and brightness is higher.

Figure 3:
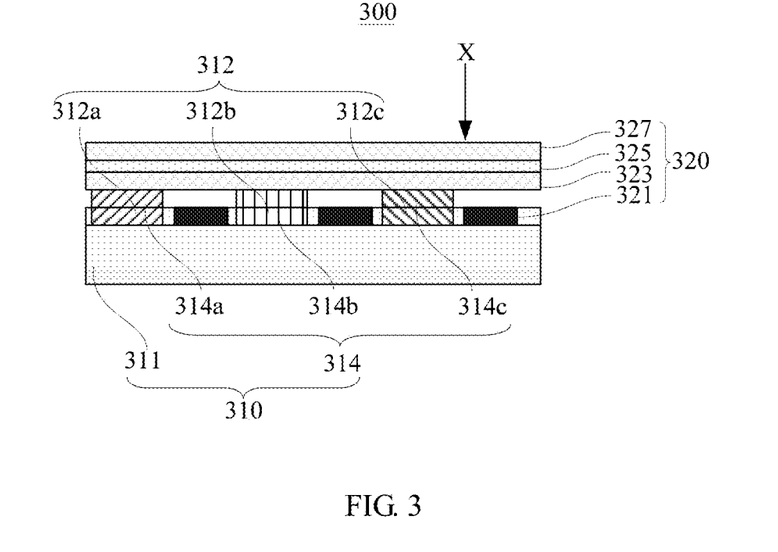
FIG. 3 is a schematic structural diagram of a display apparatus according to another alternative embodiment of the present disclosure.

FIG. 3 is a schematic structural diagram of a display apparatus 300 according to an embodiment of the present disclosure.

The display apparatus 300 includes a display panel 310 and a light collimation module 320. The display panel 310 includes a transparent baseplate 311 and an RGB pixel array 314. Color filters 312 are disposed on the transparent baseplate 311, and the RGB pixel array 314 is disposed on the color filters 312. The color filters 312 include a red filter 312a, a green filter 312b, and a blue filter 312c that are arranged in an arrayed manner. Particular intervals are disposed between the red filter 312a, the green filter 312b, and the blue filter 312c. The pixel array 314 includes multiple RGB subpixels, that is, a red subpixel 314a, a green subpixel 314b, and a blue subpixel 314c. The red subpixel 314a, the green subpixel 314b, and the blue subpixel 314c are aligned with the red filter 312a, the green filter 312b, and the blue filter 312c of the filters 312, respectively. An edge of each filter is aligned with an edge of each corresponding subpixel.

The light collimation module 320 includes a control electrode layer 321, a first transparent substrate 323, a liquid crystal layer 325, and a second transparent substrate 327. The control electrode layer 321 is embedded in the color filters 312 and is located within the intervals between the filters of the color filters 312, that is, the red filter 312a, the green filter 312b, and the blue filter 312c. That is, the control electrode layer 321 is disposed at specified positions in the color filters 312. The specified positions are positions that are in the color filters 312 and at which orthographic projections of intervals between the red filter 312a, the green filter 312b, and the blue filter 312c fall. The orthographic projections are projections in a direction perpendicular to the display panel 310, that is, a direction of an arrow X. In addition, the positions that are in the transparent baseplate 312 and at which the control electrode layer 321 is located in the direction of the arrow X are not limited. In addition, correspondingly, if an extra transparent baseplate is disposed over the color filters 312, that is, if a transparent baseplate is disposed on the other side of the color filters 312 opposite to the transparent baseplate 311, the control electrode layer 321 may be disposed in the extra transparent baseplate or on the extra transparent baseplate. The control electrode layer 321 is made of a transparent, translucent, black, or non-transparent conductive material. The conductive material may be conductive ink. The control electrode layer 321 may be formed in a manner of ink-jet printing, nano-coating, atomic layer deposition, chemical vapor deposition, or plasma ion assisted deposition. A material of the conductive ink is indium tin oxide (ITO), indium zinc oxide (IZO), a carbon nanotube (CNT), or graphite.

The first transparent substrate 323 is disposed on the display panel 310, that is, disposed on the pixel array 314. The disposal includes directly disposing the first transparent substrate 323 on the pixel array 314, or includes disposing the first transparent substrate 323 on the color filters 312 by using a medium material.

The liquid crystal layer 325 is disposed on the first transparent substrate 323. The liquid crystal layer 325 forms a liquid crystal micro lens array with a single-sided electrode structure (IPS, In-Plane Switching) by using an electric field generated by the control electrode layer 321. The liquid crystal micro lens array forms a light collimation structure and gathers originally divergent light. Therefore, intensity of emergent light is improved.

The second transparent substrate 327 is disposed on the liquid crystal layer 325 to protect the liquid crystal layer 325.

As shown in FIG. 3, in the present disclosure, a transparent or translucent control electrode layer is disposed at positions corresponding to intervals between a red filter 312a, a green filter 312b, a blue filter 312c of color filters 312 on a display panel 310, and is combined with a liquid crystal layer 325 disposed on the color filters 312, to form a light collimation structure with a liquid crystal micro lens array. Therefore, a scattering phenomenon of emergent light of a display apparatus 300 is reduced, an image display effect is better, and brightness is higher.

Figure 4:
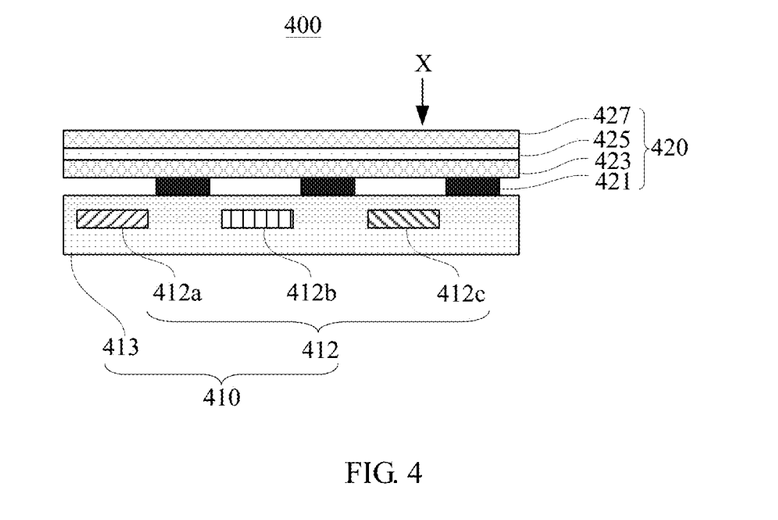
FIG. 4 is a schematic structural diagram of a display apparatus according to another alternative embodiment of the present disclosure.

FIG. 4 is a schematic structural diagram of a display apparatus 400 according to an embodiment of the present disclosure.

The display apparatus 400 includes a display panel 410 and a light collimation module 420.

The display panel 410 includes a color light-emitting baseplate 412 including an organic light-emitting diode (OLED, Organic Light-Emitting Diode), and a transparent sealing layer 413.

The color light-emitting baseplate 412 includes a red light-emitting unit 412a, a green light-emitting unit 412b, and a blue light-emitting unit 412c that are arranged in an arrayed manner. Particular intervals are disposed between the red light-emitting unit 412a, the green light-emitting unit 412b, and the blue light-emitting unit 412c. The transparent sealing layer 413 is disposed outside of the red light-emitting unit 412a, the green light-emitting unit 412b, and the blue light-emitting unit 412c to protect the light-emitting units.

The light collimation module 420 includes a control electrode layer 421, a first transparent substrate 423, a liquid crystal layer 425, and a second transparent substrate 427. The control electrode layer 421 is disposed on the transparent sealing layer 413 and is corresponding to the intervals between the light-emitting units of the color light-emitting baseplate 412, that is, the red light-emitting unit 412a, the green light-emitting unit 412b, and the blue light-emitting unit 412c. That is, the control electrode layer 421 is disposed at specified positions on the transparent sealing layer 413. The specified positions are positions that are on the transparent sealing layer 413 and at which orthographic projections of intervals between the red light-emitting unit 412a, the green light-emitting unit 412b, and the blue light-emitting unit 412c fall. The orthographic projections are projections in a direction perpendicular to the display panel 410, that is, a direction of an arrow X. It may be understood that the control electrode layer 421 may be embedded at specified positions on the transparent sealing layer 413. The specified positions are positions that are on the transparent sealing layer 413 and that are directly opposite to the intervals between the red light-emitting unit 412a, the green light-emitting unit 412b, and the blue light-emitting unit 412c. In addition, the positions that are on the transparent sealing layer 413 and at which the control electrode layer 421 is located in the direction of the arrow X are not limited. The control electrode layer 421 is made of a transparent, translucent, black, or non-transparent conductive material, that is, in a transparent, translucent, black, or non-transparent state. The conductive material may be conductive ink. The control electrode layer 421 may be formed in a manner of ink-jet printing, nano-coating, atomic layer deposition, chemical vapor deposition, or plasma ion assisted deposition. A material of the conductive ink is indium tin oxide (ITO), indium zinc oxide (IZO), a carbon nanotube (CNT), or graphite.

The first transparent substrate 423 and the control electrode layer 421 are disposed on the transparent sealing layer 413 on the display panel 410. The disposal includes directly disposing the first transparent substrate 423 on the transparent sealing layer 413, or includes disposing the first transparent substrate 423 on the transparent sealing layer 413 by using a medium material.

The liquid crystal layer 425 is disposed on the first transparent substrate 423. The liquid crystal layer 425 forms a liquid crystal micro lens array with a single-sided electrode structure (IPS, In-Plane Switching) by using an electric field generated by the control electrode layer 421. The liquid crystal micro lens array forms a light collimation structure and gathers originally divergent light. Therefore, intensity of emergent light is improved.

The second transparent substrate 427 is disposed on the liquid crystal layer 425 to protect the liquid crystal layer 425.

As shown in FIG. 4, in the present disclosure, a control electrode layer is disposed at positions corresponding to intervals between a red light-emitting unit 412a, a green light-emitting unit 412b, and a blue light-emitting unit 412c of a color light-emitting baseplate 412 on a display panel 410, and is combined with a liquid crystal layer 425 disposed on a sealing layer 413, to form a light collimation structure with a liquid crystal micro lens array. Therefore, a scattering phenomenon of emergent light of a display apparatus 400 is reduced, an image display effect is better, and brightness is higher.

Figure 5:
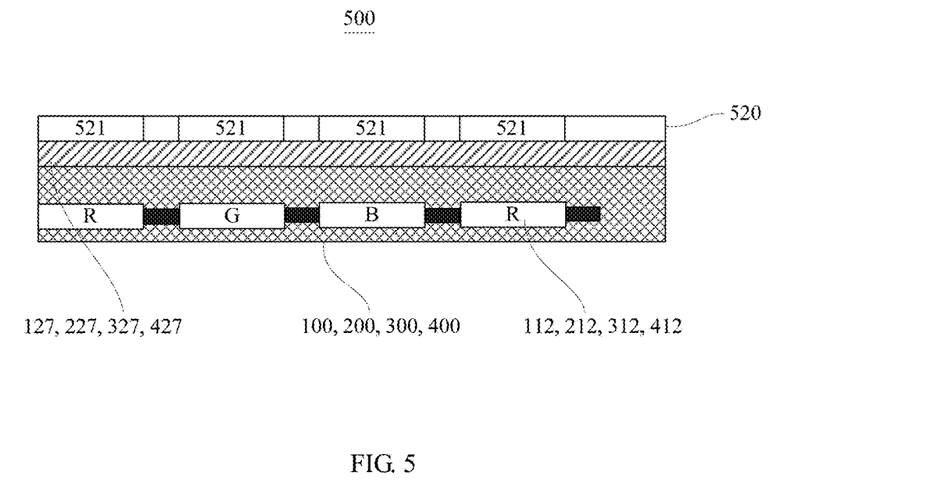
FIG. 5 is a schematic structural diagram of a stereoscopic display apparatus according to an embodiment of the present disclosure.

Referring to FIG. 5, it shows a stereoscopic display apparatus 500 applying a display apparatus 100, 200, 300, or 400 in the present disclosure. The stereoscopic display apparatus 500 includes the display apparatus 100, 200, 300, or 400, and a stereoscopic imaging layer 520 implementing stereoscopic imaging. The stereoscopic imaging layer 520 is disposed on a second transparent substrate 127, 227, 327, or 427 at the top layer of the display apparatus 100, 200, 300, or 400.

The stereoscopic imaging layer 520 includes: multiple electro-optic modulation units 521, separately arranged at positions corresponding to multiple subpixels, that is, RGB subpixels, on color filters 212, or 312 of the display apparatus 100, 200, or 300 or on a color light-emitting baseplate 412 of the display apparatus 400, and is configured to alternately deflect, to different projection directions according to an applied electric field E that changes in a time division manner, light of an image displayed by multiple pixel units, so as to present a stereoscopic image, for example, to generate, on a central depth plane, a stereoscopic image that can be watched with naked eyes.

For example, the multiple electro-optic modulation units 521 may be directly disposed on the pixel units, or disposed at positions at which the multiple pixel units are entirely covered or enclosed. For example, particular intervals (space) or dividers (such as a filler, a spacer, or an insulation plate) exist between the pixel units and the electro-optic modulation units.

According to an embodiment of the present disclosure, the electro-optic modulation units 521 may be made of liquid crystals. After an electric field is applied, the liquid crystals can change refractive indexes. Different electric fields may be corresponding to different refractive indexes. That is, the liquid crystals are used to form an electrically tunable prism array on an electro-optic modulation layer. When light passes through the liquid crystals to which the electric field is applied, a phase difference of emergent light varies with the external electric field. This is not limited in this embodiment of the present disclosure. Alternatively, the electro-optic modulation layer may be made of another crystalline material that can change a refractive index when an electric field is applied, for example, may be made of lithium niobate crystals.

Figure 6:
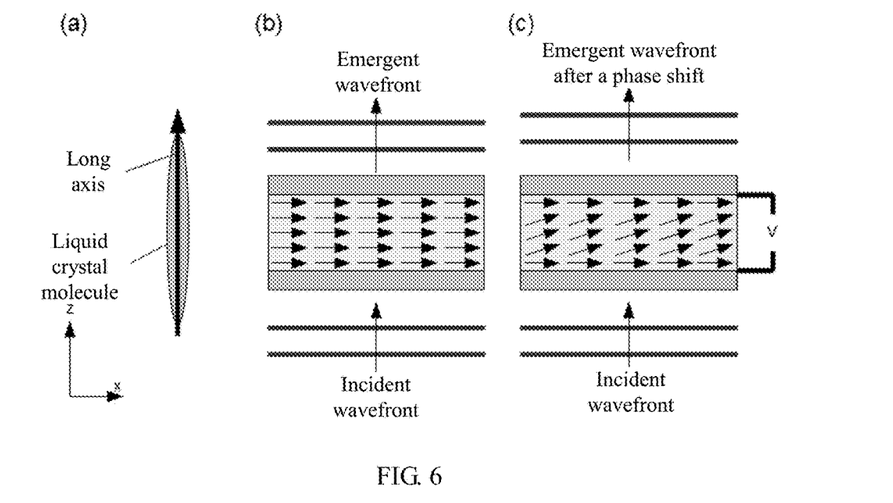
FIG. 6 is a schematic diagram of liquid crystal molecule statuses before and after an electro-optic modulation unit applies an electric field according to an embodiment of the present disclosure.

According to this embodiment of the present disclosure, electrodes may be arranged on two opposite planes of the liquid crystals, and the electro-optic modulation units 521 apply electric fields to the liquid crystals by applying voltages to the electrodes. After the electric fields are applied, a liquid crystal included in each electro-optic modulation unit is equivalent to a micro lens, and liquid crystals included in the multiple electro-optic modulation units form a micro lens array. FIG. 6 is a schematic diagram of liquid crystal molecule statuses before and after an electro-optic modulation unit applies an electric field according to an embodiment of the present disclosure. For example, as shown in FIG. 6(*a*), for a nematic liquid crystal material, a liquid crystal molecule is like a rod and is uniaxial, and a longitudinal direction of the rod is a long-axis direction. As shown in FIG. 6(*b*), when no voltage is applied, long axes of liquid crystal molecules arranged in a plane point to a specified direction. As shown in FIG. 6(*c*), when an applied voltage is higher than a threshold voltage of a liquid crystal, liquid crystal molecules are redirected, that is, mechanically rotated, so that a phase shift occurs on incident light. Such mechanical rotation is caused by torque generated when the applied voltage induces a dipole moment. It should be noted that the liquid crystal molecules shown in FIG. 6 are the same as liquid crystal molecules used by a liquid crystal layer in the display apparatus shown in FIG. 1, 2, 3, or 4 in the present disclosure.

Figure 7:
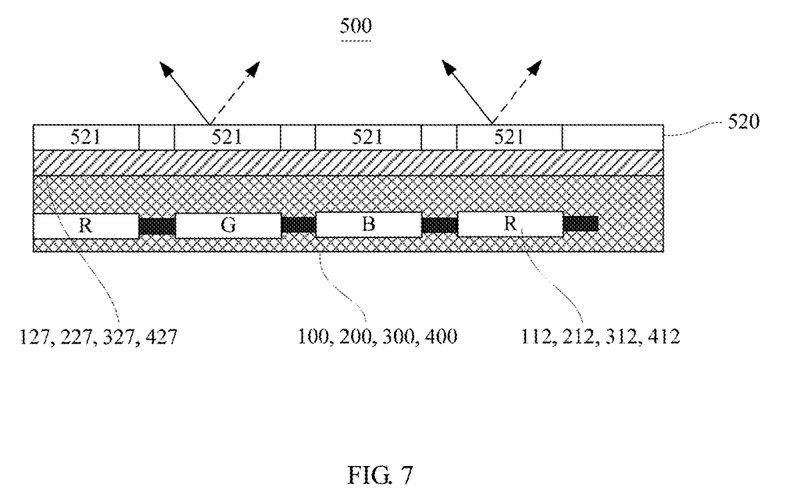
FIG. 7 is a schematic light-emitting diagram of a stereoscopic display apparatus in FIG. 5 according to an embodiment of the present disclosure.

To form a stereoscopic image, different light needs to be projected onto positions corresponding to eyes of a person. Observation directions corresponding to different projection methods may include one left-eye observation direction (for example, a direction of a solid arrow in FIG. 7) and one right-eye observation direction (for example, a direction of a dashed arrow in FIG. 7), and this is not limited in this embodiment of the present disclosure. For example, different observation directions may include multiple left-eye observation directions and multiple right-eye observation directions, so that multiple persons watch the stereoscopic image simultaneously.

For example, to ensure that resolution of a stereoscopic image presented by the stereoscopic display apparatus is all pixel units, an applied electric field needs to be enough, so that all pixels are used in a vision persistence period display an image in each direction. A time division manner used when an electric field is applied to multiple pixel units may be consistent with a time division manner used when a display panel displays images in different projection directions, so that a person can observe, with eyes in different observation directions, a stereoscopic image presented by the multiple pixel units. Two projection directions are used as an example. In a first period, each pixel unit displays an image in a first projection direction (for example, corresponding to the right-eye observation direction), and an electro-optic modulation unit corresponding to the pixel unit deflects, to the first projection direction according to an applied first electric field, light emitted by the pixel unit. In a second period, the pixel unit displays an image in a second projection direction (for example, corresponding to the left-eye observation direction), and the electro-optic modulation unit deflects, to the second projection direction according to an applied second electric field, light emitted by the pixel unit.

According to the technical solution in this embodiment of the present disclosure, images in different directions may be displayed in a time division manner, and light of images displayed by multiple pixel units is deflected to different directions according to an applied electric field that changes in a time division manner, so that resolution of an image presented in each direction is all pixel units on a display panel. Therefore, auto-stereoscopic display resolution is improved.

According to this embodiment of the present disclosure, the electro-optic modulation layer further enables the display panel to present a two-dimensional image when no electric field is applied.

Figure 8:
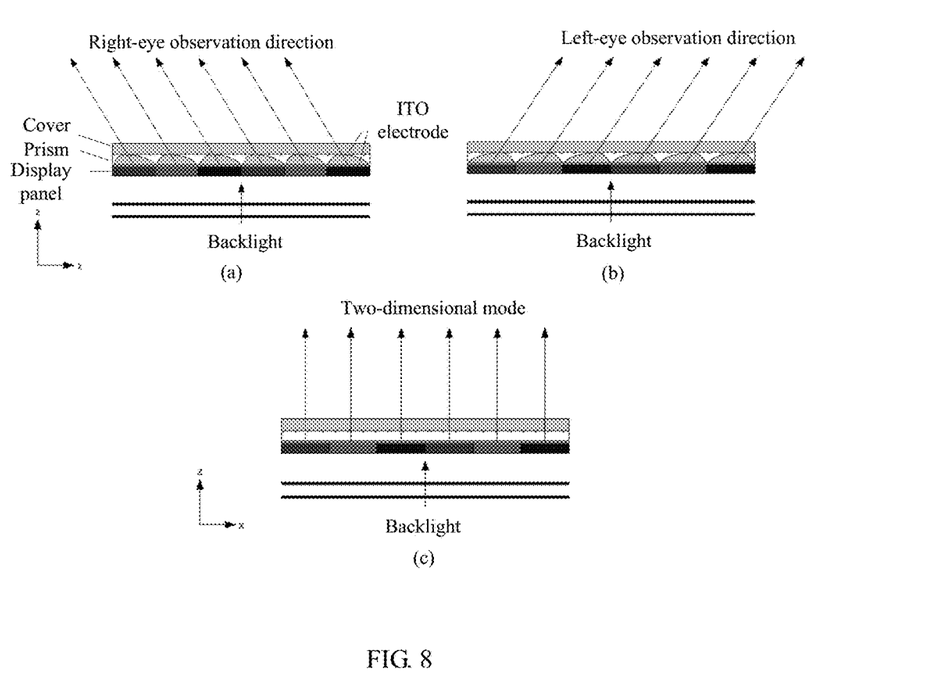
FIG. 8 is a schematic diagram of a stereoscopic display apparatus in different display statuses according to an embodiment of the present disclosure.

FIG. 8 is a schematic diagram of different display statuses of a stereoscopic display apparatus according to an embodiment of the present disclosure. As shown in FIG. 8(*a*), when a first electric field is applied, a liquid crystal forms a prism under an action of the first electric field, to deflect, to a right-eye observation direction, light generated after backlight is incident into a display panel. As shown in FIG. 8(*b*), when a second electric field is applied, a liquid crystal forms a prism under an action of the second electric field, to deflect, to a left-eye observation direction, light generated after backlight is incident into a display panel. As shown in FIG. 8(*c*), when no electric field is applied, a liquid crystal does not deflect light. In this case, a two-dimensional image may be presented.

It should be understood that this embodiment of the present disclosure is not limited to that all pixel units display images in a same projection direction in a same period. For example, in a first period, a first part of pixel units may display an image in a first projection direction, and a second part of pixel units may display an image in a second projection direction; and in a second period, the first part of pixel units may display an image in the second projection direction, and the second part of pixel units may display an image in the first projection direction, provided that images displayed by all pixel units can be observed in different observation directions in a vision persistence period of human eyes, or provided that a sum of the first period and the second period is less than the vision persistence period of human eyes.

According to this embodiment of the present disclosure, a view (view) of binocular stereoscopic parallax is displayed each time. This is different from a conventional technical solution in which space of a display panel is divided. Therefore, resolution is higher, compared with a conventional technology.

It should be understood that during specific implementation, a glass cover may cover a stereoscopic imaging layer, and other mediums may be disposed between the display panel and an electro-optic modulation layer and between the electro-optic modulation layer and the glass cover according to a requirement.

In this embodiment of the present disclosure, a dedicated control module may be disposed to control the display panel to display images in different projection directions in a time division manner, and to control an electric field applied by an electro-optic modulation unit to change in a time division manner, so as to display corresponding images in different projection directions and form a stereoscopic image that can be observed with naked eyes.

According to this embodiment of the present disclosure, multiple electro-optic modulation units are in a one-to-one correspondence with multiple pixel units. The electro-optic modulation layer includes: an electro-optic modulation medium layer, where the electro-optic modulation medium layer includes an electro-optic modulation medium and has an out-light surface and an in-light surface; a first electrode layer, including an electrode located on the out-light surface of the electro-optic modulation medium layer; and a second electrode layer, including an electrode located on the in-light surface of the electro-optic modulation medium layer. Each electro-optic modulation unit in the multiple electro-optic modulation units includes an electro-optic modulation medium located on the electro-optic modulation medium layer, at least one first electrode located on the first electrode layer, and at least one second electrode located on the second electrode layer. The electro-optic modulation medium deflects, to a preset projection direction according to an electric field generated according to a voltage configuration received between the at least one first electrode and the at least one second electrode, light of an image displayed by a pixel unit corresponding to the electro-optic modulation medium.

According to this embodiment of the present disclosure, the foregoing electrodes may be made of a transparent conductive material, for example, may be a transparent conductive material such as indium tin oxide (Indium Tin Oxide, ITO). The electro-optic modulation medium may include a crystalline material such as a liquid crystal or a lithium niobate crystal. That is, the electro-optic modulation medium layer may be a liquid crystal layer or another crystal layer. The at least one second electrode may be consecutive ITO transparent conductive films. For example, transparent conductive film electrodes are distributed on an inner surface of the cover and over an display panel, configured to generate an electric field, and further configured to separate the display panel and a liquid crystal layer. In this embodiment of the present disclosure, a tunable liquid crystal prism may be disposed for each pixel, that is, a tunable pixel-level liquid crystal prism may be disposed. Therefore, in this embodiment of the present disclosure, a crosstalk phenomenon between pixels can be eliminated.

According to this embodiment of the present disclosure, each electro-optic modulation unit in the multiple electro-optic modulation units includes: at least two first electrodes, separately configured to receive at least two voltages; and at least one second electrode, used as a common electrode and configured to receive a reference voltage.

The at least two first electrodes may be a series of conductive stripes. These conductive stripes may be evenly distributed or unevenly distributed, provided that such arrangement can ensure that an electro-optic modulation unit generates a micro lens effect or a linear phase effect when a voltage is received. An electric potential difference between a voltage received by each first electrode and the reference voltage forms a corresponding electric field on a liquid crystal layer. For example, the reference voltage may be 0 V.

According to this embodiment of the present disclosure, each electro-optic modulation unit in the multiple electro-optic modulation units includes: multiple first electrodes, separately configured to receive multiple voltages. At least two voltages in the multiple voltages are different, so that an electro-optic modulation medium has a function of an off-axis lens under an action of an electric field generated according to the multiple voltages received by the multiple first electrodes and a reference voltage received by at least one second electrode used as a common electrode, so as to deflect light to a preset projection direction.

Figure 9:
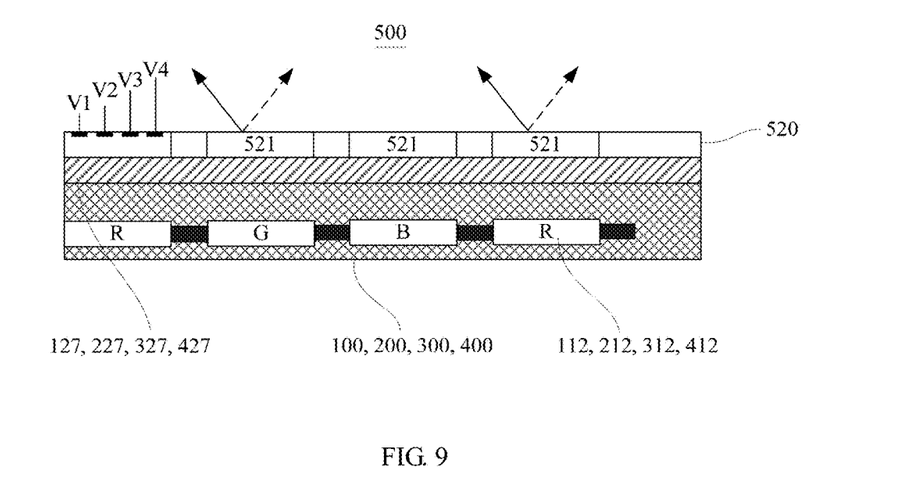
FIG. 9 is a schematic distribution diagram of electrodes of an electro-optic modulation unit in a stereoscopic display apparatus in FIG. 5 according to an embodiment of the present disclosure.

According to this embodiment of the present disclosure, an electric field may be generated on a liquid crystal layer by adjusting voltages received by these electrodes, so that a required phase configuration is generated on the liquid crystal layer. Different phase configurations depend on different voltage configurations and different electrode distribution. For example, as shown in FIG. 9, each electro-optic modulation unit may include four first electrodes. One of the four electrodes is located at an edge of a pixel unit, and received voltages are separately V1, V2, V3, and V4. A quantity of first electrodes included in each electro-optic modulation unit may be greater than 4 or less than 4. A smoothness characteristic of a liquid crystal ensures that four electrodes are enough to generate almost smooth phase distribution.

According to this embodiment of the present disclosure, each electro-optic modulation unit in the multiple electro-optic modulation units includes two first electrodes and a resistive film connecting the two first electrodes. The two first electrodes are separately configured to receive two voltages. The two voltages are different, so that an electro-optic modulation medium has a function of a lens with a linear tilted phase under an action of an electric field generated according to the two voltages received by the two first electrodes and a reference voltage received by at least one second electrode used as a common electrode, so as to deflect light to a preset projection direction.

For example, the two first electrodes may be two conductive stripes that are made of an ITO material and that are arranged along two opposite edges of each electro-optic modulation unit, and retain preset intervals with first electrodes of an adjacent electro-optic modulation unit. Consecutive resistive films may be made of a transparent material that has a specified resistivity, and connect the two conductive stripes, so as to generate, on the resistive films when the two first electrodes receive different voltages, voltage distribution that changes continuously. An electric potential difference between the voltage distribution that changes continuously and the reference voltage generates, on a liquid crystal layer covered by the resistive films, electric field distribution that changes continuously. The electric field distribution changes continuously, so that a liquid crystal corresponding to the resistive films has a function of a lens with a linear tilted phase, so as to deflect the light to the preset projection direction.

According to this embodiment of the present disclosure, each electro-optic modulation unit in the multiple electro-optic modulation units deflects, to a first projection direction in a first period according to an electric field generated according to a first voltage configuration received between at least two first electrodes and at least one second electrode used as a common electrode, light of an image displayed by a pixel unit corresponding to an electro-optic modulation medium, and deflects, to a second projection direction in a second period according to an electric field generated according to a second voltage configuration received between the at least two first electrodes and the at least one second electrode used as the common electrode, light of an image displayed by the pixel unit corresponding to the electro-optic modulation medium. The first voltage configuration is different from the second voltage configuration, so that electric fields that change in a time division manner are generated in the first period and the second period.

For example, the common electrode receives a reference voltage, and the at least two first electrodes separately receive corresponding voltages in the first period and the second period.

According to this embodiment of the present disclosure, each electro-optic modulation unit in the multiple electro-optic modulation units includes two first electrodes and a resistive film connecting the two first electrodes. The two first electrodes are separately configured to receive two voltages. The two voltages are different, and each electro-optic modulation unit shares a first electrode with an adjacent electro-optic modulation unit, so that an electro-optic modulation medium has a function of a lens with a linear tilted phase under an action of an electric field generated according to the two voltages received by the two first electrodes and a reference voltage received by at least one second electrode used as a common electrode, so as to deflect light to a preset projection direction.

According to this embodiment of the present disclosure, each electro-optic modulation unit in the multiple electro-optic modulation units deflects, to a first projection direction in a first period according to a first voltage configuration received between two first electrodes and at least one second electrode used as a common electrode, light of an image displayed by a pixel unit corresponding to an electro-optic modulation medium, and deflects, to a second projection direction in a second period according to a second voltage configuration received between the two first electrodes and the at least one second electrode used as the common electrode, light of an image displayed by the pixel unit corresponding to the electro-optic modulation medium. In addition, an adjacent electro-optic modulation unit deflects, to the second projection direction in the first period according to the second voltage configuration received between two first electrodes and at least one second electrode of the adjacent electro-optic modulation unit, light of an image displayed by a pixel unit corresponding to an electro-optic modulation medium of the adjacent electro-optic modulation unit, and deflects, to the first projection direction in the second period according to the first voltage configuration received between the two first electrodes and the at least one second electrode of the adjacent electro-optic modulation unit, light of an image displayed by the pixel unit corresponding to the electro-optic modulation medium of the adjacent electro-optic modulation unit, where the at least one second electrode is used as the common electrode. The first voltage configuration is different from the second voltage configuration, so that electric fields that change in a time division manner are generated in the first period and the second period.

According to this embodiment of the present disclosure, each electro-optic modulation unit in the multiple electro-optic modulation units includes at least two second electrodes. An arrangement direction of the at least two second electrodes is different from an arrangement direction of at least two first electrodes. When the stereoscopic display apparatus is in a first direction, the at least two first electrodes separately receive at least two voltages, and the at least two second electrodes are used as common electrodes to receive a reference voltage. In addition, when the stereoscopic display apparatus is in a second direction, the at least two first electrodes are used as the common electrodes to receive the reference voltage, and receive at least two voltages when the stereoscopic display apparatus is in the second direction, namely, the at least two second electrodes separately receive at least two voltages.

According to this embodiment of the present disclosure, each electro-optic modulation unit in the multiple electro-optic modulation units includes: multiple second electrodes, separately configured to receive multiple voltages. At least two voltages in the multiple voltages are different, so that an electro-optic modulation medium has a function of an off-axis lens under an action of an electric field generated according to the multiple voltages received by the multiple second electrodes and a reference voltage received by at least two first electrodes used as common electrodes, so as to deflect light to a preset projection direction.

According to this embodiment of the present disclosure, each electro-optic modulation unit in the multiple electro-optic modulation units includes two second electrodes and a resistive film connecting the two second electrodes. The two second electrodes are separately configured to receive two voltages. The two voltages are different, so that an electro-optic modulation medium has a function of a lens with a linear tilted phase under an action of an electric field generated according to the two voltages received by the two second electrodes and a reference voltage received by at least two first electrodes used as common electrodes, so as to deflect light to a preset projection direction.

According to this embodiment of the present disclosure, each electro-optic modulation unit in the multiple electro-optic modulation units deflects, to a third projection direction in a third period according to a third voltage configuration received between at least two first electrodes used as common electrodes and at least two second electrodes, light of an image displayed by a pixel unit corresponding to an electro-optic modulation medium, and deflects, to a fourth projection direction in a fourth period according to a fourth voltage configuration received between the at least two first electrodes used as the common electrodes and the at least two second electrodes, light of an image displayed by the pixel unit corresponding to the electro-optic modulation medium. The third voltage configuration is different from the fourth voltage configuration, so that electric fields that change in a time division manner are generated in the third period and the fourth period.

According to this embodiment of the present disclosure, each electro-optic modulation unit in the multiple electro-optic modulation units includes two second electrodes and a resistive film connecting the two second electrodes. The two second electrodes are separately configured to receive two voltages. The two voltages are different, and each electro-optic modulation unit shares a second electrode with an adjacent electro-optic modulation unit, so that an electro-optic modulation medium has a function of a lens with a linear tilted phase under an action of an electric field generated according to the two voltages received by the two second electrodes and a reference voltage received by at least two first electrodes used as common electrodes, so as to deflect light to a preset projection direction.

According to this embodiment of the present disclosure, each electro-optic modulation unit in the multiple electro-optic modulation units deflects, to a third projection direction in a third period according to a third voltage configuration received between two first electrodes and at least two second electrodes used as common electrodes, light of an image displayed by a pixel unit corresponding to an electro-optic modulation medium, and deflects, to a fourth projection direction in a fourth period according to a fourth voltage configuration received between the two first electrodes used as the common electrodes and the two second electrodes, light of an image displayed by the pixel unit corresponding to the electro-optic modulation medium. In addition, an adjacent electro-optic modulation unit deflects, to the fourth projection direction in the third period according to the fourth voltage configuration received between two first electrodes used as the common electrodes and at least two second electrodes of the adjacent electro-optic modulation unit, light of an image displayed by a pixel unit corresponding to an electro-optic modulation medium of the adjacent electro-optic modulation unit, and deflects, to the third projection direction in the fourth period according to the third voltage configuration received between the two first electrodes and the two second electrodes, used as the common electrodes, of the adjacent electro-optic modulation unit, light of an image displayed by the pixel unit corresponding to the electro-optic modulation medium of the adjacent electro-optic modulation unit. The third voltage configuration is different from the fourth voltage configuration, so that electric fields that change in a time division manner are generated in the third period and the fourth period.

According to this embodiment of the present disclosure, a width of each electro-optic modulation unit may be less than or equal to 75 μm.

Optionally, in another embodiment, a width of each electro-optic modulation unit may be less than or equal to 25 μm.

According to this embodiment of the present disclosure, in unit length in at least one direction of the stereoscopic display apparatus, a quantity of electrodes included in an electro-optic modulation unit is greater than a quantity of pixel units. In other words, a quantity of electrodes included in an electro-optic modulation unit corresponding to each pixel unit is greater than one.

Correspondingly, in a display apparatus 100, 200, 300, or 400 provided in the embodiments of the present disclosure, after light emitted from a display panel 110, 210, 310, or 410 passes through a light collimation module 120, 220, 320, or 420 and is collimated, the light is incident into a directly corresponding electro-optic modulation unit 521, so that the light received by the electro-optic modulation unit 521 is more centralized and has higher intensity. Correspondingly, light emitted from the electro-optic modulation unit 521 also has higher intensity, that is, brightness is also higher. In this way, an imaging effect of a stereoscopic display apparatus 500 can be improved effectively.

Figure 10:
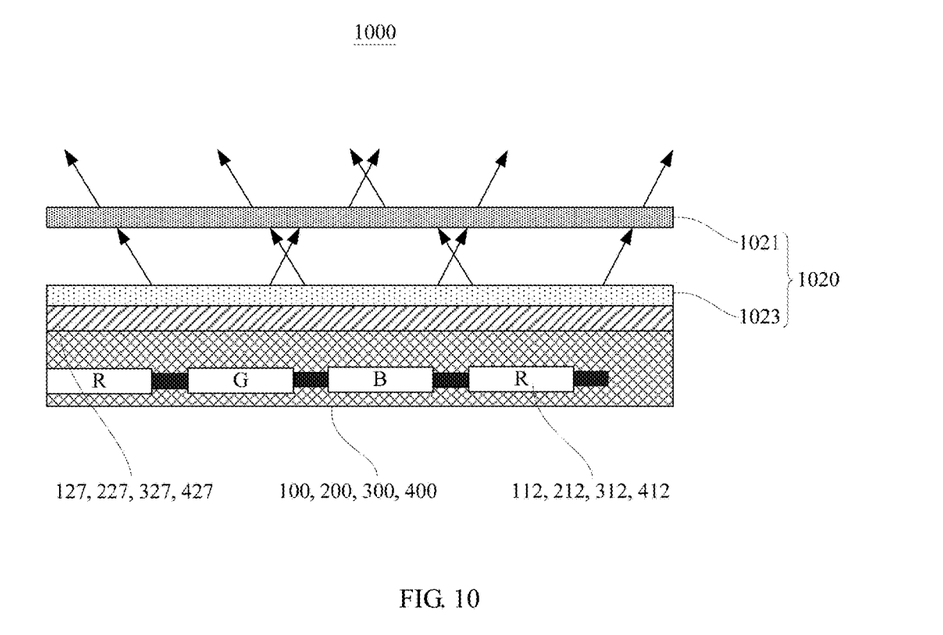
FIG. 10 is a schematic structural diagram of a stereoscopic display apparatus according to another embodiment of the present disclosure.

Referring to FIG. 10, FIG. 10 shows a stereoscopic display apparatus 1000 applying a display apparatus 100, 200, 300, or 400 in the present disclosure. The stereoscopic display apparatus 1000 includes the display apparatus 100, 200, 300, or 400, and a stereoscopic imaging layer 1020 implementing stereoscopic imaging. The stereoscopic imaging layer 1020 is disposed on a second transparent substrate 127, 227, 327, or 427 on the top layer of the display apparatus 100, 200, 300, or 400. The stereoscopic imaging layer 1020 includes at least two lens layers. For ease of description, FIG. 10 merely shows two lens layers 1021 and 1023.

The two lens layers 1021 and 1023 are disposed in a superimposed manner at a position corresponding to an RGB pixel array on color filters 212, or 312 or on a color light-emitting baseplate 412 in the display apparatus 100, 200, 300, or 400, and configured to deflect, to different projection directions according to applied electric fields that change in a time division manner, light that is of an image displayed by the pixel array and that passes through the lens component.

For example, light of the images displayed by the pixel array is alternately deflected to different projection directions by controlling a switching time of electric fields that are applied to the at least two lens layers and that change in a time division manner and a switching time of images that are displayed by the pixel array in a time division manner and that are taken in a same scenario from two different shooting angles, so that stereoscopic images are presented in every two projection directions corresponding to each observer. The different projection directions are corresponding to left-eye observation directions and right-eye observation directions of at least two observers. There is a vision persistence period of human eyes. Therefore, stereoscopic images watched by multiple persons with naked eyes can be generated, provided that light of images displayed by all pixels on a display panel is deflected to multiple observation directions in the vision persistence period of human eyes.

The at least two lens layers may be directly disposed on the pixel array, or disposed at positions at which multiple pixels are entirely covered or enclosed. For example, particular intervals (space) or dividers (such as a filler, a spacer, or an insulation plate) exist between the pixel array and the lens layers.

The lens layers may be made of liquid crystals (liquid crystal, LC for short). After an electric field is applied, the liquid crystals can change refractive indexes. Different electric fields may be corresponding to different refractive indexes. That is, the liquid crystals are used to form an electrically tunable prism array on the lens layers. When light passes through the liquid crystals to which the electric field is applied, a phase difference of emergent light varies with the external electric field. This is not limited in this embodiment of the present disclosure. Alternatively, the lens layers may be made of another crystalline material that can change a refractive index when an electric field is applied, for example, may be made of lithium niobate crystals.

In this embodiment of the present disclosure, at least two lens layers are disposed and configured to deflect, to different projection directions according to applied electric fields that change in a time division manner, light of an image displayed by a pixel array, so that a three-dimensional stereoscopic image can be watched by multiple persons simultaneously.

According to this embodiment of the present disclosure, the pixel array is specifically configured to display, in a time division manner, images taken from two shooting angles, to present stereoscopic images in every two projection directions.

For example, the stereoscopic images are presented in every two projection directions corresponding to each observer.

To ensure that resolution of a stereoscopic image presented by the stereoscopic display apparatus 1000 is all pixel units, the electric fields applied to the lens layers need to satisfy that light of images displayed by all pixels is deflected to multiple different projection directions in a vision persistence period. A time division manner used when a display panel 110, 210, 310, or 410 displays images taken from different shooting angles should be corresponding to the electric fields that are applied to the at least two lens layers and that change in a time division manner, so that the images that are displayed by all pixels on the display panel and that are taken in the same scenario from the two shooting angles are separately watched with eyes by each observer in multiple observers in a vision persistence period. That is, a three-dimensional stereoscopic image with high resolution can be observed by multiple persons in different observation directions.

According to this embodiment of the present disclosure, the at least two lens layers may be N lens layers. The N lens layers are configured to alternately deflect, to $2^N$ different projection directions in $2^N$ preset periods according to the applied electric fields that change in a time division manner, light of an image displayed by each pixel in the pixel array. N is a positive integer greater than 1.

According to this embodiment of the present disclosure, the electric fields that are applied to the at least two lens layers and that change in a time division manner may be synchronously switched at an interval of a preset period. In other words, after a preset period, the electric fields applied to the at least two lens layers are simultaneously switched.

According to this embodiment of the present disclosure, the electric fields that are applied to the at least two lens layers and that change in a time division manner may be alternately switched at an interval of a preset period. In this way, a switching cycle of an electric field that is applied to each lens layer and that changes in a time division manner is at least two preset periods, a switching frequency of the electric field that is applied to each lens layer and that changes in a time division manner can be reduced, the electric field can be implemented more easily, and a service life of a lens layer can be prolonged.

For example, at a moment $t_1$, an electric field applied to a first lens layer is switched, and electric fields applied to remaining N−1 lens layers keep unchanged. After a preset period, that is, at a moment $t_2$, an electric field applied to an $m^{th}$ lens layer is switched, and electric fields applied to remaining N−1 lens layers keep unchanged. The $m^{th}$ lens layer is any lens layer different from the first lens layer in the N lens layers.

According to a technology in which a phase characteristic of an electrically tunable liquid crystal is used to implement 3D displaying, in a viewing scope, an electrically tunable liquid crystal lens may guide a beam to any direction. A relatively thick liquid crystal layer is required to implement that the beam has a minimum deflection angle during a single observer's use. The minimum deflection angle of the beam needs to be increased, to satisfy simultaneous use by multiple observers. This also requires a relatively thick LC layer. However, a switching speed of an LC lens is inversely proportional to the square of a thickness of the LC lens. Therefore, a relatively thick LC layer means a relatively low switching speed. For example, if a high-quality naked-eye 3D effect experienced by one observer is shared with two observers, a refresh rate of a display is halved because a switching speed of the LC lens is limited. This degrades quality of a video stream.

According to the stereoscopic display apparatus in this embodiment of the present disclosure, at least two lens layers are used to project light onto at least two observers in a time sequence manner. Light loss increases because of use of the at least two lens layers. Therefore, intensity of light emitted from a display panel 110, 210, 310, or 410 needs to be increased. However, currently, light loss caused by light scattering is very heavy. Therefore, in the present disclosure, scattered light is gathered by using a light collimation module 120, 220, 320, or 420 in a display apparatus 100, 200, 300, or 400, and then projected onto the two lens layers. Light utilization is improved, without a need of increasing energy consumption of the display apparatus, and a better display effect can be obtained, even in a multi-view stereoscopic display apparatus.

According to another embodiment of the present disclosure, a terminal is provided, including a display apparatus shown in FIG. 1, 2, 3, or 4, or a stereoscopic display apparatus described in the embodiment in FIG. 5 or FIG. 10.

According to the terminal in this embodiment of the present disclosure, a better display effect can be provided.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A display apparatus, comprising a display panel and a light collimation module, wherein the display panel comprises an RGB pixel array, and the RGB pixel array comprises multiple RGB pixels disposed with intervals therebetween; and the light collimation module comprises a control electrode layer, a first transparent substrate, a liquid crystal layer, and a second transparent substrate, the control electrode layer is disposed within the intervals between the RGB pixels or at positions that are corresponding to the intervals between the RGB pixels, the first transparent substrate is disposed on the display panel and covers the control electrode, the liquid crystal layer is disposed on the first transparent substrate, and the second transparent substrate is disposed on the liquid crystal layer, wherein the display panel further comprises a transparent baseplate, the RGB pixel array, and color filters, the color filters comprise a red filter, a green filter, and a blue filter that are arranged in an arrayed manner, and particular intervals exist between the red filter, the green filter, and the blue filter; and the control electrode layer is embedded in the color filters and within the particular intervals between the red filter, the green filter, and the blue filter.

2. A stereoscopic display apparatus, comprising: the display apparatus according to claim 1 and a stereoscopic imaging layer, wherein the stereoscopic imaging layer is disposed on the second transparent substrate of the display apparatus, and the stereoscopic imaging layer comprises: multiple electro-optic modulation units, separately arranged at positions corresponding to the RGB pixels in the display apparatus, and configured to alternately deflect, to different projection directions according to an applied electric field E that changes in a time division manner, light of an image displayed by multiple pixel units, so as to present a stereoscopic image.

3. A stereoscopic display apparatus, comprising: the display apparatus according to claim 1 and a stereoscopic imaging layer, wherein the stereoscopic imaging layer comprises at least two lens layers, the at least two lens layers are disposed in a superimposed manner at a position corresponding to a pixel array of the display panel in the display apparatus, and configured to deflect, to different projection directions according to applied electric fields that change in a time division manner, light that is of an image displayed by the pixel array and that passes through the at least two lens layers.

4. A terminal, comprising: the display apparatus according to claim 1.

* * * * *